United States Patent
Larsson et al.

(10) Patent No.: US 7,255,210 B2
(45) Date of Patent: Aug. 14, 2007

(54) TELESCOPIC FORK LEG FOR A VEHICLE, PREFERABLY A MOTORCYCLE

(75) Inventors: Mats Larsson, Upplands-Väsby (SE); Tomas Alatalo, Kalix (SE)

(73) Assignee: Ohlins Racing AB (SE)

( * ) Notice: Subject to any disclaimer, the term of this patent is extended or adjusted under 35 U.S.C. 154(b) by 0 days.

(21) Appl. No.: 11/087,625

(22) Filed: Mar. 24, 2005

(65) Prior Publication Data
US 2005/0212190 A1    Sep. 29, 2005

(30) Foreign Application Priority Data
Mar. 24, 2004    (SE) .................................. 0400782

(51) Int. Cl.
F16F 9/512 (2006.01)
F16F 9/342 (2006.01)

(52) U.S. Cl. ................. 188/315; 188/280; 188/322.14; 188/318

(58) Field of Classification Search ................ 188/315, 188/280, 282.5, 282.4, 322.19, 318, 319.1, 188/319.2, 313, 314, 316, 317; 267/64.26, 267/124, 287, 118, 127; 280/276, 281.1, 280/283
See application file for complete search history.

(56) References Cited

U.S. PATENT DOCUMENTS 4,561,669 A * 12/1985 Simons ....................... 280/276
4,844,428 A     7/1989 Margolis et al.
4,964,625 A * 10/1990 Kawamura .................. 280/276

(Continued)

FOREIGN PATENT DOCUMENTS

EP     1106403    6/2001

(Continued)

OTHER PUBLICATIONS

International Search Report No. EP 05445005, dated Jan. 11, 2006, 2 pages.

*Primary Examiner*—Thomas Williams
(74) *Attorney, Agent, or Firm*—Connolly Bove Lodge & Hutz LLP (57) ABSTRACT

A telescopic fork leg incorporates mutually displaceable inner and outer tube parts and a damping arrangement for damping the relative movements of the tube parts. The damping arrangement comprises tubular and coaxially disposed units. A piston belonging to a first outer tube part operates in a chamber within the interior of the tubular units in a medium present in the chamber, which medium, at a piston speed above a chosen value, is transferred between the top and bottom sides of the piston via passage(s) disposed in, on or by the piston and adjustable damping-influencing members. The passage(s) is/are closed by the damping-influencing member(s) at piston speeds below the chosen value and the medium is conducted only via one or more leak flow paths extending from the chamber on one side of the piston, via a gap between the outside of the inner tubular unit and within a second tubular unit disposed outside the inner unit, one or more leak-flow-size-determining members, and back to the chamber on the other side of the piston. Independently adustable compression and the return leak flows can be easily arranged around the piston and an important component in the leg can provide a strength function and a leak-flow-conducting function.

10 Claims, 6 Drawing Sheets

U.S. PATENT DOCUMENTS 5,158,161 A * 10/1992 Yamaoka et al. ........ 188/319.1
5,586,627 A    12/1996 Nezu et al.
5,649,611 A     7/1997 Nakadate
5,799,758 A     9/1998 Huang
5,996,746 A * 12/1999 Turner et al. ............... 188/269
6,217,049 B1 *  4/2001 Becker ....................... 280/276
2001/0042663 A1 11/2001 Marking et al.

FOREIGN PATENT DOCUMENTS

GB        2378231      2/2003

* cited by examiner

TELESCOPIC FORK LEG FOR A VEHICLE, PREFERABLY A MOTORCYCLE

The present invention relates to a telescopic fork leg for a vehicle, preferably a motorcycle. The telescopic fork leg comprises mutually displaceable inner and outer tube parts and a damping arrangement for damping the relative movements of the tube parts. The damping arrangement comprises tubular and coaxially disposed units and a piston (main piston) which belongs to the first outer tube part and is arranged to operate in a chamber within the interior of the tubular units in the damping arrangement in a medium present in the chamber, which medium, in dependence on the speed of the piston or at piston speed above a certain value, passes between the top and bottom sides of the piston via passages and damping-influencing members, for example shims, by the side of the piston and/or via passages and damping-influencing members in the piston. The said speed or value is chosen with the said damping-influencing members, which can be activated to or from their fully closed positions in dependence on the choice or setting of the members in question. Alternatives to a motorcycle might be a scooter, a water-borne vehicle, etc. As the medium, hydraulic oil with possible additives, gas, etc. may be utilized. The invention is primarily intended for use in connection with a pressurized telescopic front fork.

Similar telescopic front forks are previously known per se and the present invention can be utilized, inter alia, in the pressurized telescopic front fork sold on the general market by the applicant to the present patent application. Reference is also made to patent SE 514755 for such a front fork arrangement, which has been obtained by the said applicant.

In this particular kind of telescopic fork equipment, the need has arisen to be able to provide a leak flow or bleed function arrangement which shall be present at low speeds between the telescopic parts or the telescopic tubes, which, in a known manner, are connected to or support the vehicle wheel in question (vehicle front wheel), runner, pontoon, etc. by means of a first telescopic part or telescopic tube and to the vehicle chassis by means of a second telescopic part or a second telescopic tube. The leak flow or the bleed function will reduce damping forces at low relative speeds between the telescopic parts, for example speeds from just above zero to about 0.1 metre/second. The leak flow function allows the vehicle wheel or equivalent, when the vehicle is driven over an uneven ground surface, to be essentially undamped at relatively low or low speeds between the wheel and the vehicle.

If the said leak flow function is applied and utilized in respect of telescopic forks, there is a need for the construction, despite the built-in leak flow function, to be carried out with conventional components and without substantial reconstructions of the telescopic fork leg as such. For instance, there may be a desire to put components belonging to the telescopic tube and damping arrangements to dual use. It is also imperative for the leak flow function to be able to be arranged such that it is easily adjustable, in which case the setting arrangement should be able to be realized for individual or coordinated setting in respect of two or more telescopic front fork legs.

It is also imperative to be able to realize the telescopic leg so that the leak flow function is present upon compression and/or expansion movements of the leg and so that, where leak flow will be present in both directions, the leak flow function for one direction does not affect the leak flow function in the other direction, and vice versa.

The object of the present invention is to solve, inter alia, all or some of the problems indicated above.

A telescopic fork leg according to the invention may principally be deemed to be characterized in that, at piston speeds below the said value, one or more leak flow passages or leak flow paths are present, which lead from the said chamber on one side of the piston, via a gap between the outside of the inner tubular unit and within a second tubular unit disposed outside the inner unit in the damping arrangement, and one or more leak-flow-size-determining members, and back to the chamber on the other side of the piston, i.e. the passage(s) or path(s) lead past or to the side of the piston when the damping-influencing members have closed the passages through the piston. A further characteristic is that the said member(s) is/are arranged so as to be adjustable.

In a refinement of the inventive concept, in the direction of compression of the tube parts, a first leak flow path can be establishable by means of a first one-way valve function and a first leak-flow-determining member. Furthermore, in the direction of expansion of the tube parts, a second leak flow path can be establishable by means of a second one-way valve function and a second leak-flow-determining second member. The adjustment can in this case be carried out such that the first and second leak flows substantially correspond to one another in size or have different sizes. The said leak-flow-size-determining member can be provided with an adjustable bleed needle function, which is arranged so as to be adjustable from the outside of the leg. The said inner tube part can also have a dual function, by acting as the said tubular second unit in the damping arrangement and thereby operating with both strength-establishing and leak flow-conducting functions. The leg as such can form part of a telescopic front fork, the two legs of which can have substantially similar construction and working. The respective leg can therefore operate with one or more adjustably arranged leak flow paths, the adjustment being able to be made from the outside of the particular leg.

Further refinements of the inventive concept derive from the following sub-claims.

As a result of that which has been proposed above, the new function(s) can easily be integrated with existing front fork designs. The said dual use of components can, for example, involve a telescopic fork tube in the actual telescopic function being utilized both as a strength-producing member and as a leak-flow-conducting member. Conventional one-way valve functions can be utilized. The valve functions are in one embodiment pressure-direction-controlled, but can in principle be controlled differently, for example computer-controlled. As a result of the leak flow paths, the displacement of medium between the piston sides can be guaranteed at relatively low piston speeds when the shims or equivalent have closed the passages through the piston. The leak flow is also arranged so as to be adjustable with the valves and it is possible with the setting function to assign the telescopic fork small or low damping forces in respect of small piston movements.

A currently proposed embodiment of a telescopic fork leg according to the invention will be described below with simultaneous reference to the appended drawings, in which.

Figure 1A:
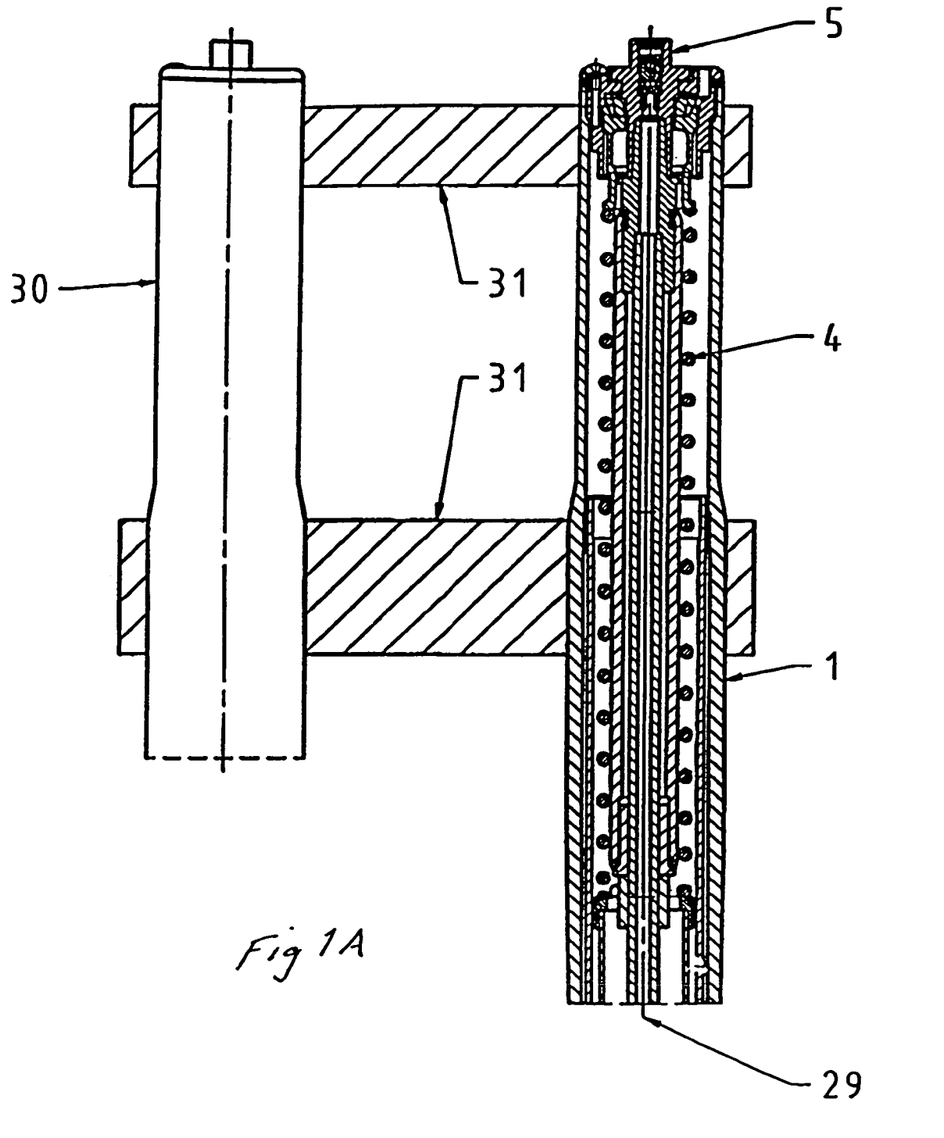
FIGS. 1A and 1B show together, in longitudinal section, a telescopic leg which, together with a further telescopic leg, forms part of a fork arrangement fitted to a chassis, for example a motorcycle chassis, and with a symbolically indicated wheel (front wheel)
Figure 1B:
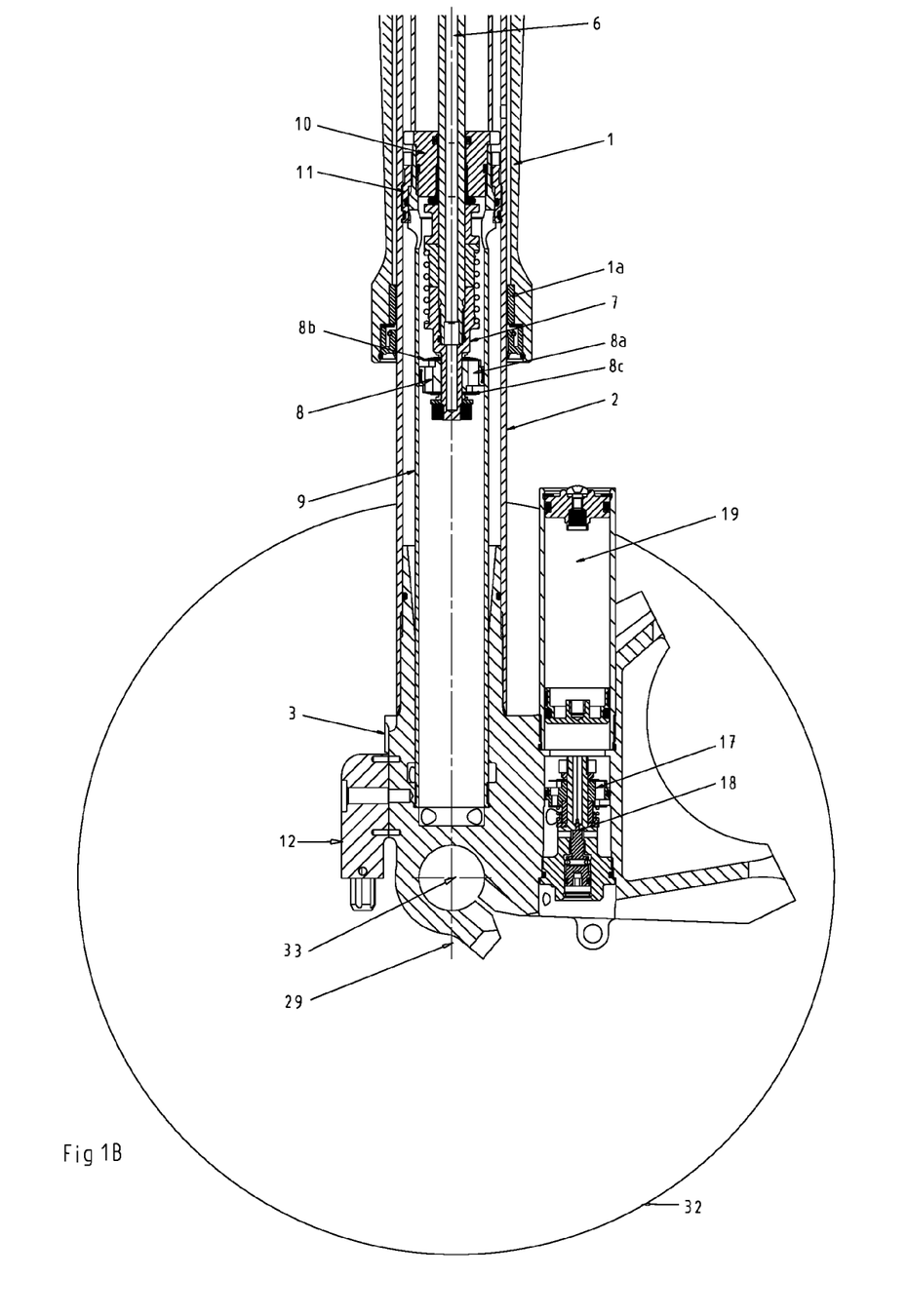

The invention will be described below in connection with its use in a telescopic fork leg having a construction which is fundamentally known. The basic construction is described here only in outline. FIGS. 1A and 1B can be put together in order to indicate the below-specified construction principle for the telescopic leg. An outer tube with bushings, 1a, forming part of the leg, is denoted by 1. 2 denotes an inner tube and 3 denotes a bottom piece. A spring forming part of the leg is denoted by 4 and the leg comprises an adjusting member 5 for setting the spring bias. A piston rod is denoted by 6 and a piston holder is denoted by 7. The main piston of the telescopic leg is illustrated by 8. The piston is provided in a known manner with one or more passages 8a and shims disposed on the side of the latter, a stack of compression shims having been denoted by 8b and a stack of return or expansion shims having been denoted by 8c. The leg is provided with a damping system, the inner tube of which has been denoted by 9. An inner seal assembly, which seals between the piston rod and the inner tube of the damping system, has been labelled 10. An outer seal assembly, which seals between the inner tube of the damping system and the outer tube of the damping system, is denoted by 11. 12 denotes a valve housing and 13 a one-way valve which can be opened only by compression leak flow around the said piston (main piston). A needle and a nozzle for adjusting compression leak flow around the piston are illustrated by 14. A one-way valve which can be opened only by return leak flow around the main piston has been labelled 15. Needle and nozzle adjusting return leak flow around the main piston have been denoted by 16. A piston with compression shim stack, only operative by the compression flow of the piston rod displacement, has been illustrated by 17. Needle and nozzle for adjusting the compression leak flow, around the piston 17, of the piston rod displacement have been denoted by 18. 19 denotes a gas tank of a type which is known per se. Part of the construction and functions of these and other components which have not been specified may be known per se.

Figure 2:
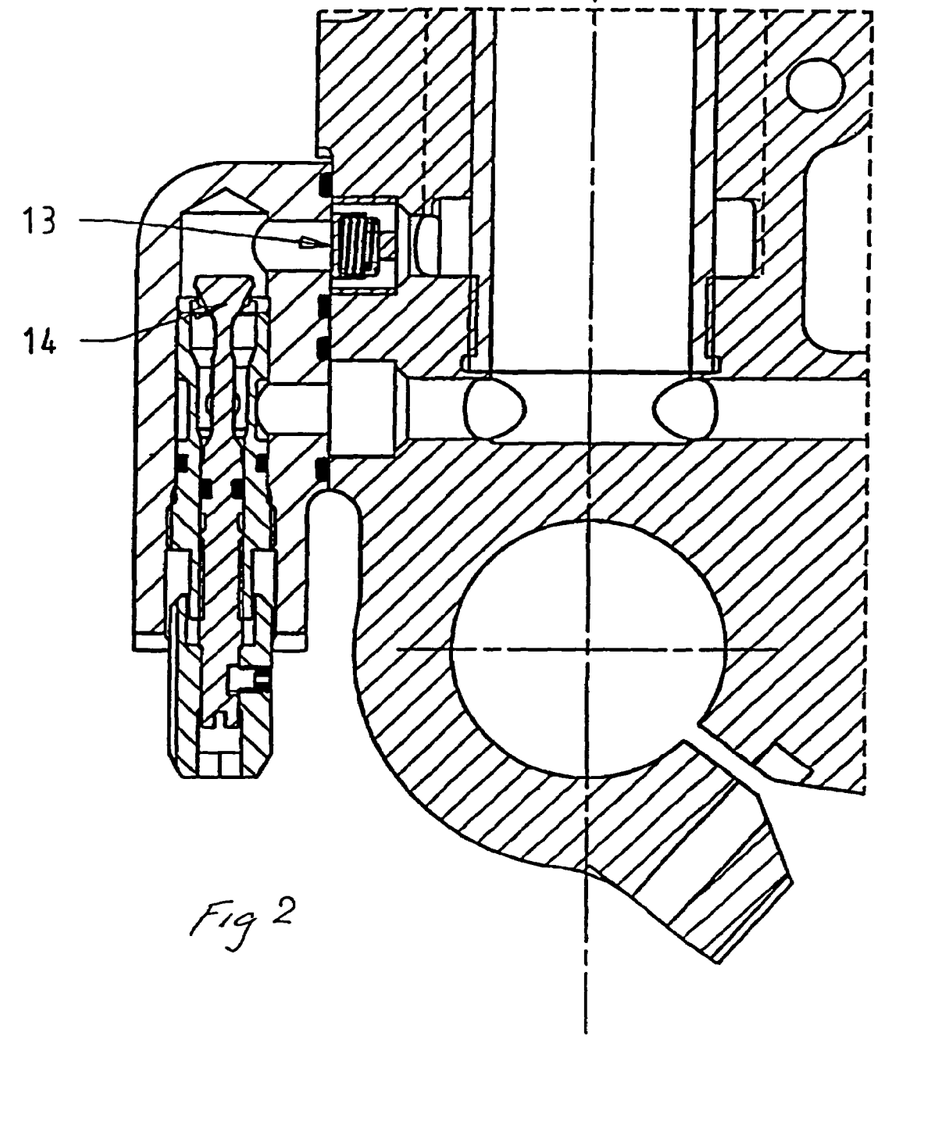
FIG. 2 shows, in longitudinal section, the first one-way valve and the first leak-flow-determining member, which acts in the direction of compression of the front fork.
Figure 3:
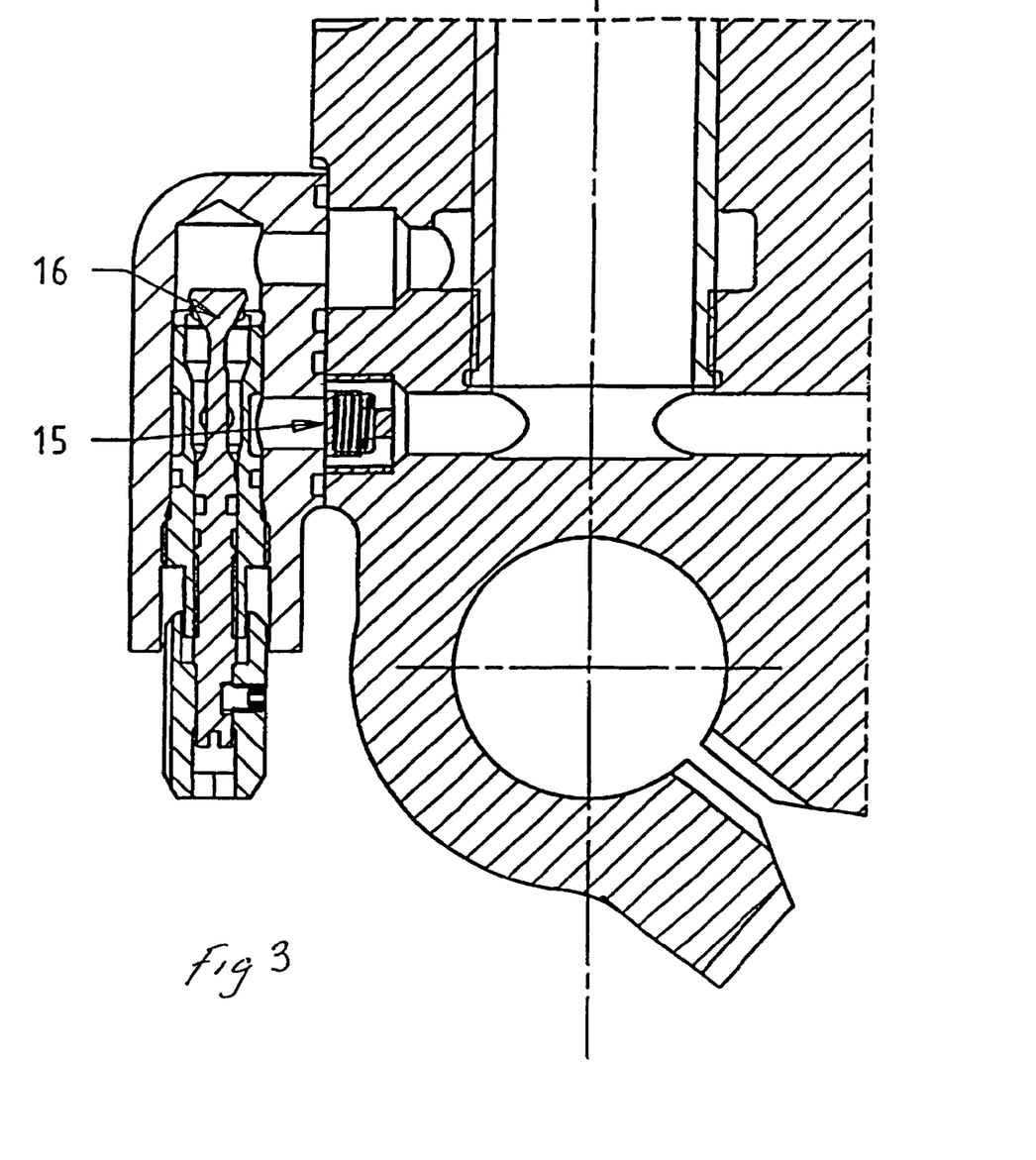
FIG. 3 shows, in longitudinal section, the second one-way valve and the second leak-flow-determining member, which acts in the direction of expansion of the front fork.

FIGS. 2 and 3 show a first one-way valve 13 and a first bleed needle 14 and a second one-way valve 15 and a second bleed needle acting in the directions of compression and expansion of the leg.

Figure 4:
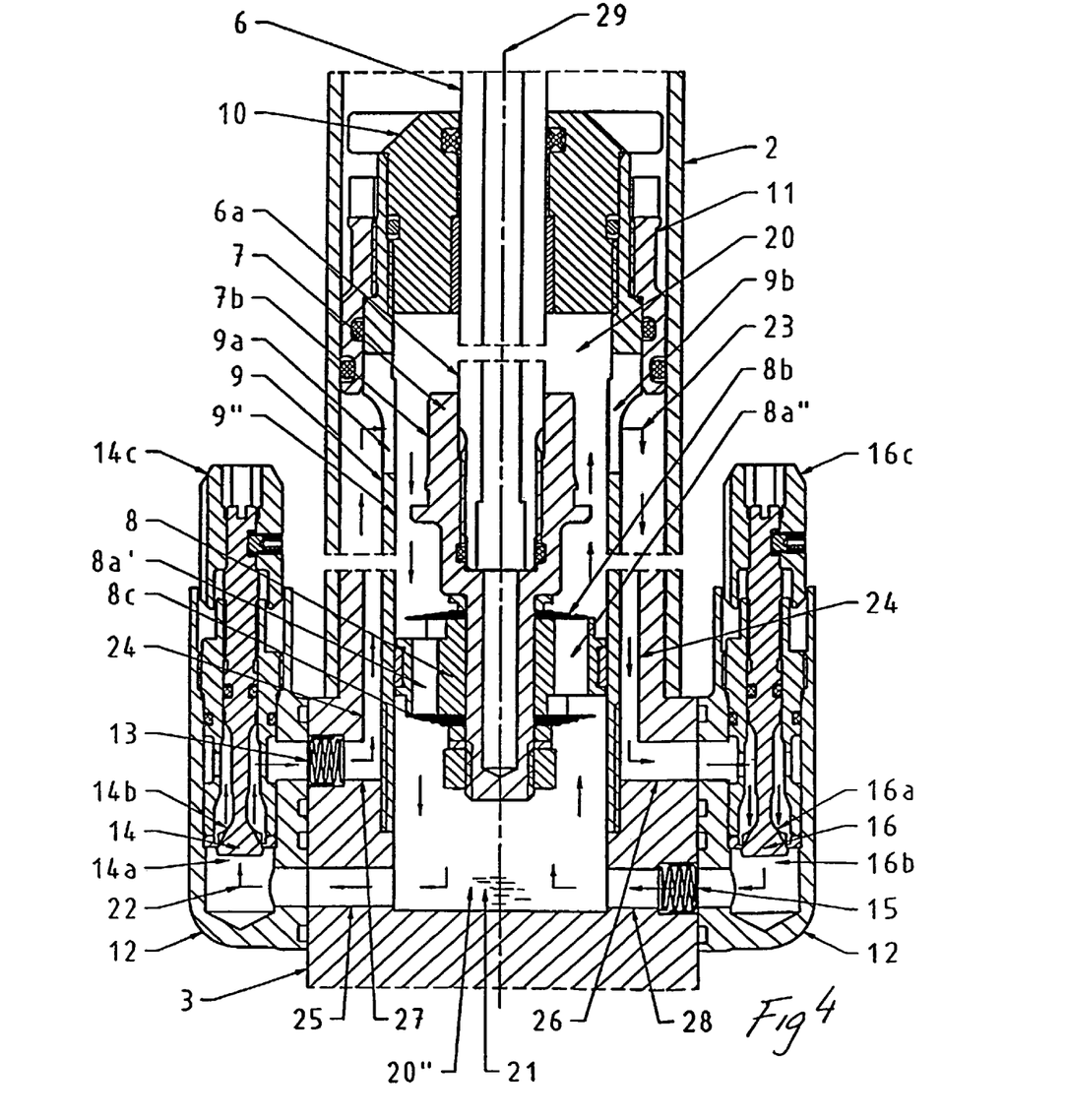
FIG. 4 shows, in longitudinal section, those parts of FIG. 1 in which the leak flow paths are establishable adjacent to the piston (main piston) of the damping arrangement and leak-flow-size-determining members.

According to FIG. 4, the piston 8 (the main piston) operates in a chamber 20', 20" in the inner tubular unit 2 of the front fork. The chamber part 20' is situated above the piston and the chamber part 20" is situated below the piston. Up and down directions for the fork are of no intrinsic importance to the described working of the fork. The piston 8 operates in a medium present in the chamber 20', 20", which medium has been symbolized with 21 and can be constituted by hydraulic oil with possible additives of a known kind. In the event of movements of the piston above a certain piston speed value, i.e. upon relative movements between the inner and outer tube parts 1 and 2 of the telescopic leg, medium passes via the recesses 8a' and 8a" of the piston and the damping-influencing members 8b, 8c, i.e. the shims in the illustrative embodiment. At piston speeds below the said values, which can be determined by means of the number or rigidity of the shims, medium is displaced between the piston sides via leak flow paths extending, inter alia, between the outsides 6a and 7b of the piston rod 6 and of the piston holder 7 and the inner face of the unit/tube 9". The latter unit/tube or the inner tube 9 of the damping system is provided with lateral recesses 9a and 9b, through which the leak flow path(s) extend(s). Between the unit 9 and the inner face of the tube part 2 there is disposed a gap 24, in which the leak flow path(s) also extend(s). The gap(s) is/are connected by substantially radial recesses 25 and 26 in the bottom piece 3 to one side of a respective leak-flow-size-determining member, which, in the illustrative embodiment, is constituted by a bleed needle 14 and 16 respectively. In the described illustrative embodiment, a first leak flow path 22 is present for the direction of compression, i.e. that direction for the tube parts of the telescopic leg which presses the tube parts towards one another. The first leak flow path is indicated by filled arrows. A second leak flow path 23 is denoted by open arrows and is attributable to the expansion direction or return direction between the tube parts. The other side of the respective bleed needle and its associated seat is connected to substantially radial ducts 27 and 28 in the bottom piece. The said ducts contain members which allow leak flow passage wholly or principally in only one direction and which, in the illustrative embodiment, consist of one-way valves 13 and 15. The said leak flow paths are also open at piston speeds at which the shims or equivalent are activated and are exerting their damping action. The size of the leak flow(s) is in this case tiny or small and does not substantially affect the damping function effected by the shims or equivalent.

A first leak flow path 22 is therefore configured, in respect of compression, from the part-chamber 20" on the bottom side of the piston, the radial recess 25, to the bottom side 14a of the bleed needle, via the bleed needle seat or the top side 14b of the bleed needle, the one-way valve 13, the radial recess 27, the gap 24 and the lateral recess 9a, and onward to the part-chamber 20'.

A second leak flow path 23 is configured, in respect of expansion, from the part-chamber 20', via the recess 9b, the gap 24, the recess 26, the top side 16a and the bleed needle 16, to the bottom side 16b and via the one-way valve 15 and the radial recess 28, whence the second leak flow path 23 leads to the part-chamber 20" below the piston.

The arrangement of the one-way valves 13 and 15 means that the compression leak flow is prevented from affecting the expansion leak flow, and vice versa.

The members which act upon the leak flows are arranged so as to be adjustable. In the illustrative embodiment, the said bleed needles are adjustably provided with setting members, which, in the illustrative embodiment, are constituted by screw head settings 14c and 16c. In the illustrative embodiment according to FIG. 4, the bleed needle arrangement extends substantially parallel with the longitudinal direction of the telescopic leg along the centre axis 29. The action of the setting members results in the adjustment or setting of the longitudinal displacement position of the bleed needle relative to the seat of the bleed needle, and hence of the size of the leak flow.

The one-way valves 13 and 15 can comprise springs and sleeve-shaped sealing parts, balls and springs, computer-controlled elements, etc.

Figure 5:
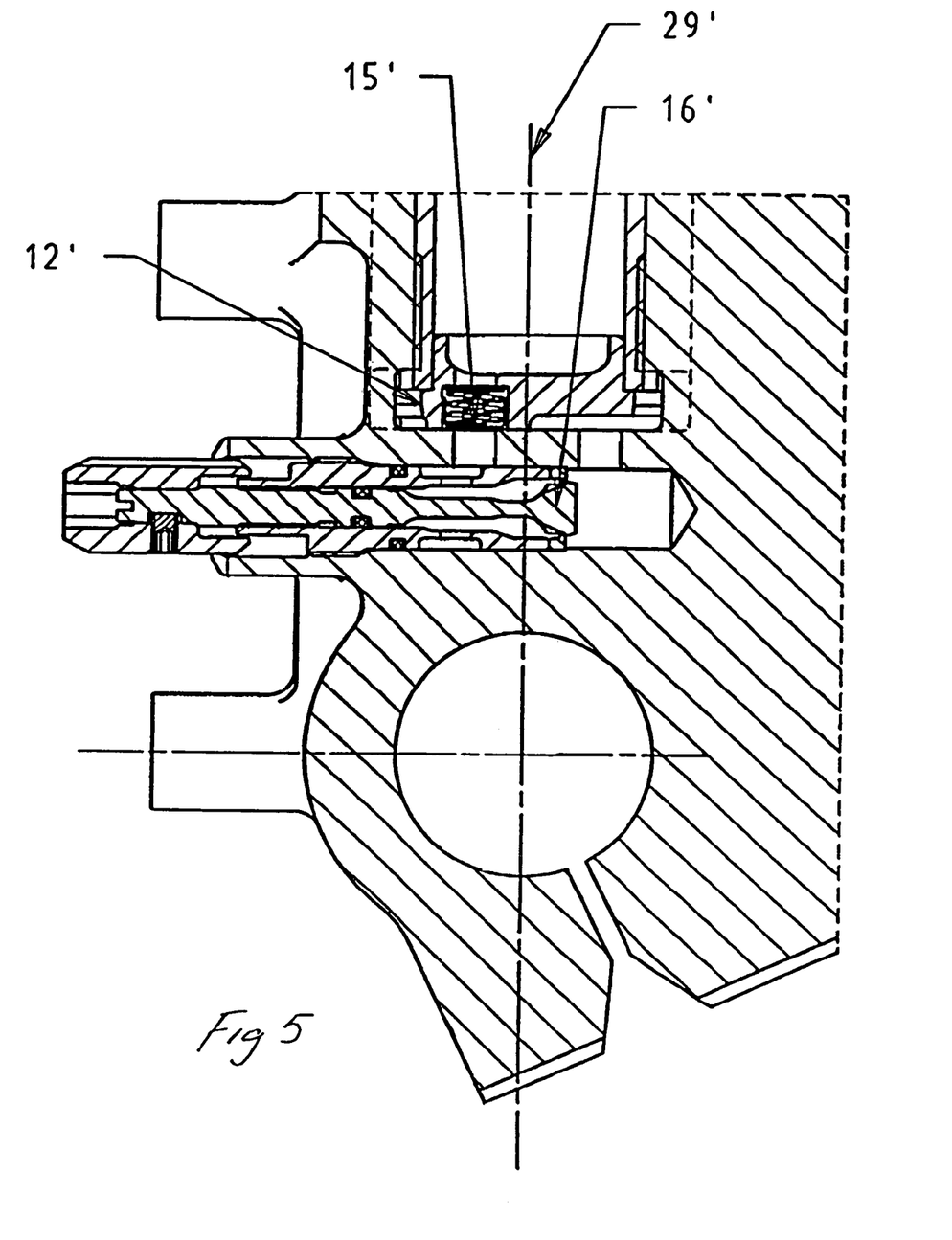
FIG. 5 shows, in a section, an application of a leak-flow-size-determining member which differs from the application of corresponding members according to FIG. 2.

In FIG. 5 an arrangement is shown, in which the adjustment and setting members and the bleed needle 16 have been disposed, in the illustrative embodiment, substantially perpendicular to the longitudinal or centre axis 29 of the telescopic leg. The position of a one-way valve 15' is also evident from the figure. In this illustrative embodiment, the valve housing has been denoted by 12'. The positionings of the valves do not, per se, affect the working of the damping system.

In FIG. 1A can be seen the application of the leg 1 to a chassis and to a partially shown further fork leg 30, which, in the illustrative embodiment, forms part, together with the leg 1, of a fork arrangement for the front wheel of a vehicle (motorcycle). The chassis has the notation 31 and the front wheel 32. The fastening to the chassis is realized by means of the outer tube and the wheel is secured to the inner tube 2. The wheel is secured at a fastening point 33 in the bottom piece. The two fork legs in the telescopic fork can be arranged identically. The respective fork leg can herein be provided with a leak flow arrangement in the compression and/or return directions. The respective leg(s) can be adjustable separately or in coordination.

The invention is not limited to the above-specified embodiments but can be subject to modifications within the scope of the patent claims or the inventive concept.

The invention claimed is:

1. A telescopic fork leg for a vehicle, said telescopic fork leg comprising:
   an outermost tube having bushings; and
   a damping arrangement comprising:
      a first inner tube arranged to run on said bushings, said first inner tube being arranged to provide a strength establishing function and a leak-flow conducting function, wherein said first inner tube and said outermost tube are displaceable with respect to each other;
      a second inner tube coaxial with said first inner tube and disposed inside said first inner tube;
      a piston attached to said outermost tube and arranged to operate within an interior chamber defined within said second inner tube, said chamber being divided into a top chamber portion bounded by a top side of said piston and a bottom chamber portion bounded by a bottom side of said piston;
      a medium disposed in said interior chamber;
      passages disposed between said top side of said piston and said bottom side of said piston;
      damping-influencing members associated with said passages, wherein said damping-influencing members are arranged such that said medium passes between said top side of said piston and said bottom side of said piston via said passages when a speed of said piston is greater than a certain value;
      a gap disposed between an outside of said second inner tube and an inside of said first inner tube;
      a first one-way valve function;
      a first leak-flow-size-determining member;
      a first leak flow path extending from said bottom chamber portion through said gap and to said top chamber portion, said first leak flow path being establishable in a compression direction of said outer tube and said first inner tube by means of said first one-way valve function and said first leak-flow-size-determining member, wherein said first leak flow path is establishable irrespective of the speed of sad piston;
      a second one-way valve function;
      a second leak-flow-size-determining member; and
      a second leak flow path extending from said top chamber portion through said gap and to said bottom chamber portion, said second leak flow path being establishable in an expansion direction of said outer tube and said first inner tube by means of said second one-way valve function and said second leak-flow-size-determining member, wherein said second leak flow path is establishable irrespective of the speed of said piston, and wherein said first leak flow path and said second leak flow path are arranged so as to not mutually influence one another.

2. The telescopic fork leg of claim 1, wherein said vehicle is a motorcycle.

3. The telescopic fork leg of claim 1, wherein said damping-influencing members comprise shims.

4. The telescopic fork leg of claim 1, wherein said certain value is about 0.1 meters per second.

5. A telescopic fork leg according to claim 1, wherein said first leak-flow-size-determining member and said second leak-flow-size-determining member are each provided with an adjustable bleed needle function, which is arranged so as to be adjustable from an outside of the leg.

6. A telescopic fork leg according to claim 5, wherein the bleed needle function is disposed in a frame part or structural part at one end of the fork leg, and/or a bleed needle forming part of the bleed needle function extends substantially parallel with or perpendicular to a principal longitudinal direction of the fork leg.

7. A telescopic fork leg according to claim 6, wherein said first one-way valve function and said second one-way valve function each comprise a one-way valve disposed in a substantially radially extending duct between the said interior chamber and said frame or structural part.

8. A telescopic fork leg according to claim 7, wherein said fork leg forms part of a telescopic front fork having at least two legs which respectively operate with said first and second leak flow paths arranged so as to be adjustable from an outside of the respective leg.

9. A telescopic fork leg according to claim 1, wherein said first leak flow path and said second leak flow path effect a damping-reducing function principally at low speeds below said certain value when the damping-influencing members have closed said passages.

10. A telescopic fork leg according to claim 1, wherein said first one-way valve function and said second one-way valve function each comprise a one-way valve disposed in a substantially radially extending duct between said interior chamber and a frame or structural part comprising a bleed needle function.

* * * * *